(12) United States Patent
Davis

(10) Patent No.: US 11,266,077 B2
(45) Date of Patent: Mar. 8, 2022

(54) MULTIPLE CELL TRAY WITH MEDIA PLUGS

(71) Applicant: HGCI, Inc., Las Vegas, NV (US)

(72) Inventor: Rod Davis, Vancouver, WA (US)

(73) Assignee: HGCI, Inc., Las Vegas, NV (US)

( * ) Notice: Subject to any disclaimer, the term of this patent is extended or adjusted under 35 U.S.C. 154(b) by 0 days.

(21) Appl. No.: 16/687,772

(22) Filed: Nov. 19, 2019

(65) Prior Publication Data

US 2020/0154645 A1    May 21, 2020

Related U.S. Application Data

(63) Continuation of application No. 14/850,928, filed on Sep. 10, 2015, now Pat. No. 10,477,780, which is a continuation-in-part of application No. 29/517,591, filed on Feb. 13, 2015, now Pat. No. Des. 758,916.

(51) Int. Cl.
| | |
|---|---|
| *A01G 9/02* | (2018.01) |
| *C05F 11/02* | (2006.01) |
| *A01G 9/029* | (2018.01) |
| *A01G 24/44* | (2018.01) |

(52) U.S. Cl.
CPC .............. *A01G 9/028* (2013.01); *A01G 9/021* (2013.01); *A01G 9/029* (2018.02); *A01G 24/44* (2018.02); *C05F 11/02* (2013.01)

(58) Field of Classification Search
CPC .......... A01G 9/028; A01G 9/021; A01G 9/02; A01G 9/1006; A01G 9/1013; A01G 9/10; A01G 9/029; A01G 9/00; A01G 9/025; A01G 9/026; A01G 9/027; A01G 9/0295; A01G 9/023; A01G 9/0297
See application file for complete search history.

(56) References Cited

U.S. PATENT DOCUMENTS

| | | | |
|---|---|---|---|
| D37,604 S | 10/1905 | Fletcher | |
| D54,749 S | 3/1920 | Huntley | |
| D79,126 S | 8/1929 | Brown | |
| 1,948,117 A * | 2/1934 | Kadow | A01G 21/00 47/48.5 |
| 2,304,278 A | 12/1942 | Poster | |
| 2,957,274 A | 10/1960 | Colvin | |
| 3,025,486 A | 3/1962 | Henry | |
| 3,120,901 A | 2/1964 | Boyd | |
| 3,180,055 A * | 4/1965 | Ferrand | A01G 9/0291 47/77 |
| 3,971,160 A * | 7/1976 | Vajtay | A01G 9/0295 47/84 |

(Continued)

OTHER PUBLICATIONS

Beware the Biochar Initiative, The Permaculture Research Institute, http://permaculturenews.org/2010/11/18/beward-the-biachar-initiative/, (online), accessed Sep. 8, 2015.

(Continued)

*Primary Examiner* — Kristen C Hayes

(74) *Attorney, Agent, or Firm* — Ulmer & Berne LLP

(57) ABSTRACT

A multiple cell horticulture propagation tray arranged in rows of star-shaped cells forming a substantially rectangular shaped tray having the cells formed therein, combined with inserted cylindrically shaped growing media plugs comprising primarily of peat moss with an amount of biochar, and enveloped to retain moisture within the growing media plugs

20 Claims, 7 Drawing Sheets

(56) References Cited

U.S. PATENT DOCUMENTS

| | | | |
|---|---|---|---|
| 4,203,004 A | 5/1980 | Cox | |
| 4,242,834 A | 1/1981 | Olsen | |
| 4,389,814 A * | 6/1983 | Andreason | A01G 9/0295 47/73 |
| D273,482 S * | 4/1984 | Andreason | D11/155 |
| D277,467 S | 2/1985 | Turunen | |
| D277,837 S | 3/1985 | Turunen | |
| D286,397 S | 10/1986 | Challans | |
| 4,854,075 A | 8/1989 | Greiling | |
| D314,750 S | 2/1991 | Wegrzyn et al. | |
| D322,033 S | 12/1991 | Palisin, Jr. et al. | |
| D322,048 S | 12/1991 | Saarinen | |
| D322,954 S | 1/1992 | Avramovich | |
| D324,028 S | 2/1992 | Sueyoshi et al. | |
| 5,105,948 A | 4/1992 | Morris et al. | |
| 5,241,784 A * | 9/1993 | Henry | A01G 9/029 47/66.1 |
| D358,802 S | 5/1995 | Kunz | |
| 5,451,171 A | 9/1995 | Dickie | |
| 5,462,457 A | 10/1995 | Schroepfer et al. | |
| D372,482 S | 8/1996 | Artus | |
| D373,568 S | 9/1996 | Bloom et al. | |
| D374,844 S | 10/1996 | Weder et al. | |
| D375,081 S | 10/1996 | Sandor et al. | |
| D375,657 S | 11/1996 | Jarvis | |
| 5,603,638 A | 2/1997 | Brown et al. | |
| 5,613,863 A | 3/1997 | Klaus et al. | |
| 5,620,335 A | 4/1997 | Siemon | |
| D379,177 S | 5/1997 | Chu | |
| D380,732 S | 7/1997 | Saunders | |
| D384,000 S * | 9/1997 | Panth | D11/143 |
| D386,047 S | 11/1997 | Jarvis | |
| D399,822 S | 10/1998 | Starec et al. | |
| D400,173 S | 10/1998 | Starec et al. | |
| D401,530 S | 11/1998 | Keskilohko | |
| D404,008 S | 1/1999 | Bennet | |
| D406,260 S | 3/1999 | Wardenburg | |
| 6,074,234 A | 6/2000 | Hasegawa | |
| 6,109,977 A | 8/2000 | Baxter et al. | |
| D437,828 S | 2/2001 | Corona | |
| D439,221 S | 3/2001 | Corona | |
| D445,763 S | 7/2001 | Corona | |
| 6,266,921 B1 | 7/2001 | Keskilohko | |
| D446,186 S | 8/2001 | Corona | |
| 6,290,512 B1 | 9/2001 | Mullen | |
| 6,379,169 B1 | 4/2002 | Corona | |
| 6,383,003 B1 | 5/2002 | Corona | |
| D460,049 S | 7/2002 | McCoy | |
| D461,677 S * | 8/2002 | Bradley | D7/357 |
| 6,435,916 B1 | 8/2002 | Amberg et al. | |
| D472,883 S | 4/2003 | Harvey | |
| D473,463 S | 4/2003 | Armstrong et al. | |
| 6,708,824 B2 | 3/2004 | Sahm | |
| D492,652 S | 7/2004 | McCoy | |
| D493,428 S | 7/2004 | McCoy | |
| 6,790,093 B2 | 9/2004 | Tanaka et al. | |
| 6,901,699 B2 * | 6/2005 | Hartman | A01G 9/021 47/77 |
| D510,067 S | 9/2005 | Miller | |
| D511,748 S | 11/2005 | Caine et al. | |
| 6,991,482 B1 | 1/2006 | Liao | |
| 6,997,723 B2 | 2/2006 | Lee | |
| D519,831 S | 5/2006 | de Cleir et al. | |
| D530,286 S | 10/2006 | Phung et al. | |
| D540,711 S | 4/2007 | Howard et al. | |
| 7,210,266 B2 | 5/2007 | Henry et al. | |
| D543,941 S | 6/2007 | Hargreaves et al. | |
| D544,840 S | 6/2007 | Hargreaves et al. | |
| D545,764 S | 7/2007 | Allison | |
| D570,295 S | 6/2008 | Hargreaves et al. | |
| 7,390,210 B2 | 6/2008 | Corona | |
| 7,431,602 B2 | 10/2008 | Corona | |
| D616,265 S | 5/2010 | Kulzer | |
| D616,267 S | 5/2010 | Kulzer | |
| D616,714 S | 6/2010 | Kulzer | |
| D616,715 S | 6/2010 | Kulzer | |
| D619,860 S | 7/2010 | Kulzer | |
| 7,785,123 B2 | 8/2010 | Corona | |
| 7,791,864 B2 | 9/2010 | Matyas et al. | |
| D624,794 S | 10/2010 | Kulzer | |
| D625,714 S | 10/2010 | Majdandzic | |
| D628,450 S | 12/2010 | Kulzer | |
| D643,266 S | 8/2011 | Kulzer | |
| 8,381,439 B2 | 2/2013 | Rubin | |
| D678,200 S | 3/2013 | Corona | |
| 8,696,241 B2 | 4/2014 | Lee et al. | |
| D726,116 S | 4/2015 | Corona et al. | |
| 9,066,474 B2 | 6/2015 | Klemm et al. | |
| D745,386 S | 12/2015 | Covey et al. | |
| D755,722 S | 5/2016 | Sinclair et al. | |
| D758,915 S | 6/2016 | MacKenzie | |
| D758,916 S * | 6/2016 | Davis | D11/143 |
| 9,486,774 B2 * | 11/2016 | Verma | C10J 3/007 |
| D783,421 S | 4/2017 | Van Belle et al. | |
| D792,277 S * | 7/2017 | Davis | D11/143 |
| D804,324 S | 12/2017 | Tayara | |
| 9,901,037 B2 * | 2/2018 | Van Rooijen | A01G 9/028 |
| 10,231,387 B2 * | 3/2019 | Blackmore, Jr. | A01G 9/0295 |
| D851,502 S | 6/2019 | Tayara | |
| D851,539 S | 6/2019 | Davis | |
| D853,859 S | 7/2019 | Tayara | |
| 10,477,780 B2 * | 11/2019 | Davis | A01G 9/028 |
| 10,477,781 B2 * | 11/2019 | Blackmore, Jr. | A01G 9/0295 |
| D871,926 S | 1/2020 | Tayara | |
| D873,171 S | 1/2020 | Van Rooijen | |
| 10,602,673 B2 * | 3/2020 | Prinster | A01G 9/021 |
| 2003/0068909 A1 | 4/2003 | Su | |
| 2003/0233787 A1 * | 12/2003 | Hartman | A01G 9/021 47/77 |
| 2013/0160361 A1 * | 6/2013 | Keithly | A01G 9/0297 47/66.7 |
| 2014/0366444 A1 * | 12/2014 | Kubern | A01G 9/0295 47/73 |
| 2015/0156973 A1 | 6/2015 | Prinster et al. | |
| 2016/0037735 A1 | 2/2016 | Blackmore, Jr. | |
| 2016/0235017 A1 * | 8/2016 | Davis | A01G 9/029 |
| 2016/0270303 A1 | 9/2016 | Cooley et al. | |
| 2017/0020092 A1 | 1/2017 | Bijl et al. | |
| 2017/0035001 A1 | 2/2017 | Blackmore, Jr. | |
| 2018/0042191 A1 | 2/2018 | Blackburn et al. | |

OTHER PUBLICATIONS

Biochar + Melted Polystyrene, Finger Lakes Biochar, http://fingerlakesbiochar.com/blog/, (online), accessed Sep. 8, 2015.

Biochar Overview, Biochar.info, www.biochar.info/biochar.biochar-overview.cfml (online), accessed Sep. 8, 2015.

Biochar, Google search, www.google.com/?gws_rd=ssl#q=biochar, (online), accessed Sep. 8, 2015.

Biochar, Wikipedia, https://en.wikipedia.org/biachar, (online), accessed Sep. 8, 2015.

Biochar is there a dark side?, ETHzurich, www.ethz.ch/en/news-and-events/etc-news/news/2014-biochar-is-there-a-dark-side.html, (online) accessed Sep. 8, 2015.

Biochan Not All It's Ground Up to Be?, Mother Earth News, www.motherearthnews.com/nature-and-environment/biochamot-all-its-ground-zb0z1307.aspx (online), accessed Sep. 8, 2015.

Botanicare 50 Pack Ready Gro Super Plugs, All Day Hydro, www.alldayhydro.com/store/index.php/growing-media/botanicare-50-pack-ready-gro-super-plugs.html, (online), accessed Sep. 8, 2015.

Build Soils Sustainable Squester Carbon Reverse GHG Effect, Sonoma Compost, www.sonomacompost.com/biochar.shtml, (online), accessed Sep. 8, 2015.

Ellepot Standard Trays & Propagation, The Blackmore Company, www.blackmoreco.com/ellepotplugtrays/elle_72_30.html, (online), accessed Sep. 8, 2015.

Farewell Peat, Earth Friendly Gardener, http://earthfriendlygardener.net/2012/16/peat-free-compost-growing-media-seed-multipurpose-potting-gardening-biodiversity-carbon-habitat/, (online), accessed Sep. 8, 2015.

(56) References Cited

OTHER PUBLICATIONS

How Much Biochar to Use for Growing Plants?, No Dig Vegetable Garden, http://www.no-dig-vegetablegarden.com/how-much-biochar-to-use-for-growing-plants.html (online), accessed Sep. 8, 2015.
Merfield, Charles; Biochar: the need for precaution?, Soil Association, May 27, 2011, www.soilassociation.org/motherearthviewarticle/articleid/328/biochar-the-need-for-precaution, (online), accessed Sep. 8, 2015.
Mother Earth BioChar, Maximum Yield, http://maximumyield.com/blog/2014/10/22/mother-earth/biochar/, (online), accessed Sep. 8, 2015.
Mother Earth Premium BioChar, Sunlight Supply, http://www.sunlightsupply.com/shop/bycategory/growingmedia/mother-earth/premium-biochar, (online), accessed Sep. 8, 2015.
Plug (horticulture), Wikipedia, https://en.wikipedia.org/wiki/plug_(horticulture), online, accessed Sep. 8, 2015.
Rockwool, Planet Natural, www.planetnatural.com/product/grodan-rockwood/, (online) accessed Sep. 8, 2015.
Starter plugs & Rockwool, Planet Natural, www.planetnatural.com/product-category/growing-indoors/plant-propagation/starter-plugs-rockwool/, (online), accessed Sep. 8, 2015.
Super Sprouter Perfect Plug Custom Blend Tray 50/count, O & G Garden & Hydroponics, http://www.oghyproponic.com/products/super-sprouter-perfect-plug-custom-blend-tray-50-county, (online), accessed Sep. 8, 2015.
Super Sprouter Perfect Plug Refill Pack, Sunlight Supply, http://www.sunlightsupply.com/shop/bycategory/cloning-and-seed-starting/super-sprouter-perfect-plug-refill-pack, (online), accessed Sep. 8, 2015.
What is BioChar, International Biochar Initiative, www.biochar-international.org/biochar, (online) accessed Sep. 8, 2015.

\* cited by examiner

MULTIPLE CELL TRAY WITH MEDIA PLUGS

CROSS-REFERENCE TO RELATED APPLICATIONS

This is a continuation of U.S. patent application Ser. No. 14/850,928, filed Sep. 10, 2015, which is a continuation-in-part of U.S. Design patent application Ser. No. 29/517,591 filed on Feb. 13, 2015, issued as U.S. Pat. No. D758,916, the disclosures of which are incorporated herein in their entireties.

TECHNICAL FIELD OF THE INVENTION

This invention relates generally to propagation trays and media plugs therefor, and, more particularly, to improved methods and apparatuses for a multiple cell horticulture propagation tray with growing media plugs for use with the tray, the tray and media plugs each, separably and in combination, incorporating various inventive features.

BACKGROUND OF THE INVENTION

Propagation trays having multiple cells or cups, each cup holding a media plug within which a seed or seedling or cutting may be placed, are generally used for starting plants. The trays are commonly made of injection molded or thermoformed plastic, and a variety of media plugs (or, simply, plugs) may be used. Some trays include square shaped cups for holding media plugs, and other trays include circular shaped cups. The trays typically resemble a cupcake tin, with each of the cups having roughly square or cylindrical shape, and the media plugs are typically square or cylindrically shaped sections of peat moss, rock wool, or compost.

Once each of the individual plant starts matures to a desired size, the starts are removed from the tray, allowing the tray to be repopulated with new media plugs for propagating a new batch of plants. Most trays are inexpensive and comprise flimsy thin plastic, and most media plugs are simply small cut sections of a particular chosen growing media. Neither have been the subject of various improvements directed to tray manufacturability and use, insertion of media plugs into the tray cells, root formation of the plant starts, composition of the media plugs themselves, the combination of improved cell design and media plug composition and design, or other areas of potential improvement. The inattention to improvements in propagation trays and media plugs is likely due to a number of factors, not the least of which may be the commoditization of such horticulture products and a lack of cost effective, quality alternatives that include innovations in tray and media plug design.

What is needed are new and innovative designs for a multiple cell propagation tray and media plugs for use in such a tray that offer improvements in cost, quality, delivery, performance, and/or feature content over existing propagation trays and medial plugs. What is needed are new and innovative methods and apparatuses for a multiple cell tray and media plugs that provide easier use and improved growing performance.

The foregoing and other objectives, features, and advantages of the invention will be more readily understood upon consideration of the following detailed description of the invention taken in conjunction with the accompanying drawings.

BRIEF DESCRIPTION THE DRAWINGS

Elements in the figures have not necessarily been drawn to scale in order to enhance their clarity and improve understanding of these various elements and embodiments of the invention. Furthermore, elements that are known to be common and well understood to those in the industry are not necessarily depicted in order to provide a clear view of the various embodiments of the invention, thus the drawings are generalized in form in the interest of clarity and conciseness.

DETAILED DESCRIPTION THE DRAWINGS

Figure 1:
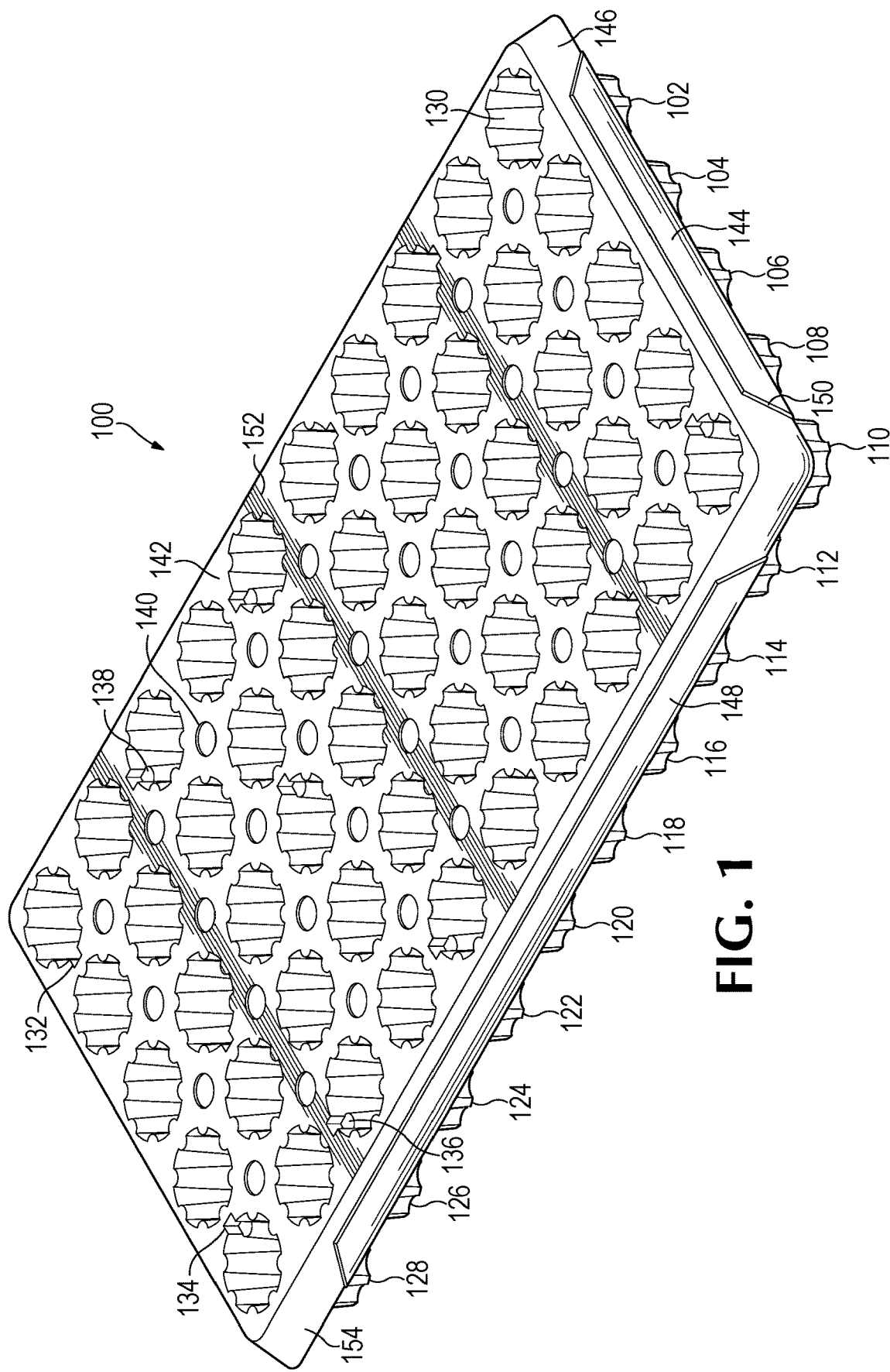
FIG. 1 shows a perspective view of a fifty cell propagation tray, as viewed from above, according to various preferred embodiments.

Although preferred embodiments are described in the context of a fifty (50) cell horticulture propagation tray arranged five (5) star-shaped cells by ten (10) star-shaped cells forming a substantially rectangular shaped tray, combined with cylindrically shaped growing media plugs comprised of peat moss with biochar, separable inventive aspects in various embodiments are disclosed. The overall shape of the tray may be other than rectangular in some embodiments. Other embodiments may comprise a different number of individual cells, also referred to as cups. Various embodiments may employ materials different than thermoformable plastic, heated and then pressed into the formed multiple cell propagation tray depicted in the various figures. Various embodiments may employ cells with different proportional dimensions than depicted, especially if such alternative embodiments do not include various separable inventive aspects. And various embodiments may mix and match various separable inventive aspects, even though such alternative embodiments may be less preferred. For example, a multiple cell tray with all the inventive aspects depicted or described may be coupled with plugs comprising something other than peat moss with biochar. Similarly, preferred embodiments of growing media plugs composed of peat moss with biochar may be used with propagation trays of alternative, and not depicted, designs.

In preferred embodiments, a method of constructing a propagation tray with growing media plugs comprises thermoforming a thin-walled sheet of thermoformable plastic to draw material forming each of the individual tray cells, features incorporated into each cell, features incorporated into the tray to improve manufacturability and handling of individual and nested or stacked formed trays, perimeter edge treatments, and voids or cutouts in the tray top surfaces and/or tray cell bottom surfaces; mixing peat moss (such as sphagnum moss), biochar (such as from forest waste) at an inclusion rate of 5% by volume, and natural or organic polymer(s) for the growing media plugs; forming or cutting each media plug into a substantially cylindrical shape sized to fit to a tray cell such that the lower portion of the plug becomes slightly compressed and captured by tapered flutes directed downward within each cell and narrowing the cross-sectional area in the cell moving downward within the cell; forming a substantially centrally oriented hole in the plug extending from its top surface sized for accepting plant seed or plant stem; inserting a growing media plug in each of the tray cells; and covering the combined tray and growing media plugs to retain moisture within the growing media.

In preferred embodiments, a multiple cell horticultural propagation tray comprises multiple individual tray cells arranged in rows, with each cell comprising a media plug therein, enveloped so as to retain moisture.

In preferred embodiments, a multiple cell horticulture propagation tray comprises a thermoformed thin-walled sheet of plastic having drawn material forming multiple individual tray cells positioned in rows so that the open tops of each cell are captured by the top surface of the tray, each cell having tapered flutes directed from top to bottom and increasingly narrowing the cross-sectional area of the cup so that the bottom of each cup has a smaller cross-sectional area than the open top of the cup, and incorporating a hole in the bottom of each cell or cup, holes within the cell-connecting top sheet, and space-creating nibs on the undersurface of each cup providing fluid path from cell interior space to space beneath the cell bottom surfaces, with the top and bottom of each cell having a star-pattern.

In preferred embodiments, a growing media plug comprises a mixture of peat moss (such as sphagnum moss), biochar (such as from forest waste) at an inclusion rate of 5% by volume, and natural or organic polymer(s) for the growing media plugs, each media plug formed or cut into a substantially cylindrical shape sized to fit into a tray cell such that the lower portion of the plug becomes slightly compressed and captured by tapered flutes directed downward within each cell and narrowing the cross-sectional area in the cell moving downward within the cell, and each media plug having a substantially centrally oriented hole formed in the plug extending from its top surface downward and sized for accepting plant seed or plant stem.

FIG. 1 shows a perspective view of a fifty cell propagation tray 100, as viewed from above, according to various preferred embodiments. The tray shown depicts a fifty (50) cell tray comprising five (5) cells (for example, cells 102, 104, 106, 108, and 110, with cells 102 and 110 comprising corner cells) by ten (10) cells (for example, cells 110, 112, 114, 116, 118, 120, 122, 124, 126, and 128, with cells 110 and 128 comprising corner cells). The tray 100 comprises fifty (50) preferably identical cells, for example, identical to cell 102 having cell opening 130, formed from substantially one sheet of material. Preferably the tray 100 is made from thermoformed plastic. As shown, the plastic sheet material has a substantially uniform thickness 150 where not deformed by the heat and pressure of the thermoforming process. From the surface 142 of the material, each of the cell openings 130 are formed. Shading 152 is used to depict the top surface of the tray 100. The holes 140 in the top surface 142 are preferably included to improve manufacturability, which may be punched during or after forming, and also facilitate separation of nested or stacked trays from one another. Various molding in steps, eg. steps 132, 134, 136, and 138, are preferably incorporated, for example within the interior each of the four corner cells and strategically elsewhere, for lifting and handling the tray mechanically during the manufacturing process. The steps or forming tool depressions, eg. 132, 134, 136, 138, and others not specifically referenced in FIG. 1, provide locations for lifting the formed tray out of molding tools.

Preferably the edges of the tray are folded downward (downward folded edges 146 and 154) and then back upward (upward folded edges 144 and 148) to provide tray rigidity and strength. The cells or cups are preferably oriented in rows to allow some separation from cell-to-cell, for separation of the plant starts and to ease removal for transplanting. Less preferred embodiments may include offsetting each row (not shown) to increase the density of cells per unit of top surface 142.

Exemplary dimensions for the tray 100 are 10 inches wide, 20 inches long, and 2 inches tall. Each cell within the tray may be approximately 2 inches deep and from 1.5 to 1.75 inches in diameter, measuring from one side of the cell opening to the other, in some embodiments.

Figure 2:
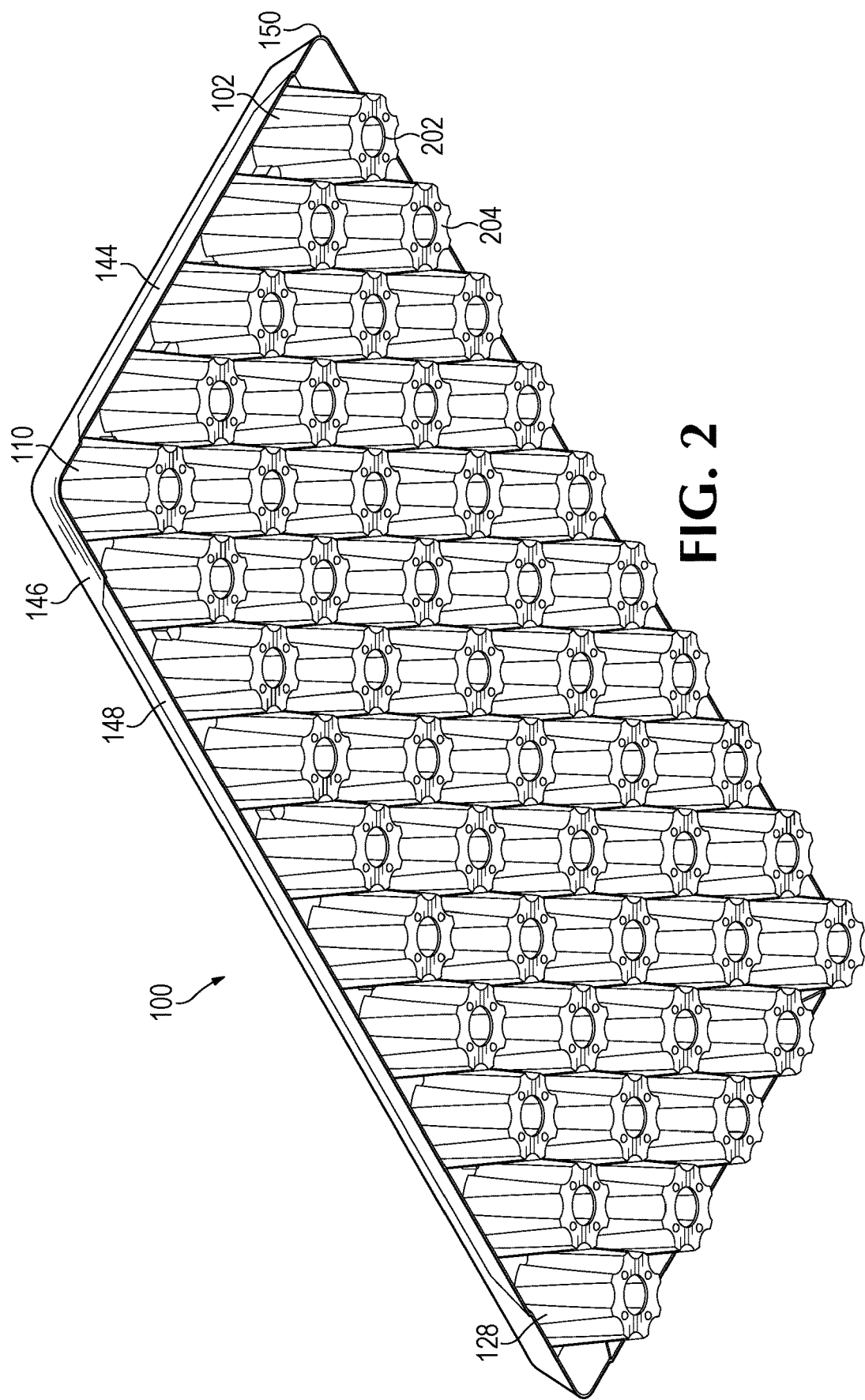
FIG. 2 shows a perspective view of a fifty cell propagation tray, as viewed from below, according to preferred embodiments.

FIG. 2 shows a perspective view of a fifty cell propagation tray 100, as viewed from below, according to preferred embodiments. More clearly shown in FIG. 2 are holes 202 on the bottom surfaces 204 of each of the cells/cups. The hole in the bottom surface of the cell provides a fluid path between the interior volume of the cell to space below the bottom surface of the cell 204. The bottom surface hole 202 provides drainage from the cell interior and allows moisture into the cell interior from below. The holes 202 also facilitate separation of nested or stacked trays.

Figure 3:
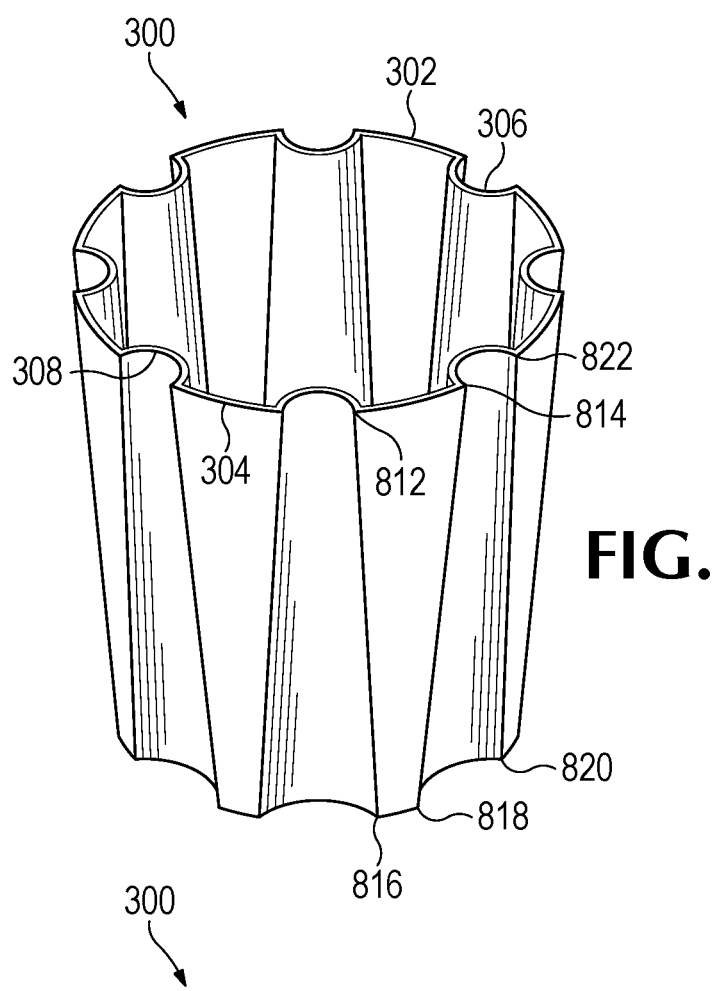
FIG. 3 shows a perspective view of an individual cup comprising the fifty cell tray depicted in FIGS. 1 and 2, as viewed from above, according to various embodiments.

FIG. 3 shows a perspective view of an individual cup 300 comprising the fifty cell tray 100 depicted in FIGS. 1 and 2, as viewed from above, according to various embodiments. As shown, each cell or cup 300 preferably includes flutes extending from the top rim 302, 304, 306, 308 of cup 300 all of the way down to the bottom of cup, the bottom surface including points referenced as 816, 818, and 820. The flutes are shown extending from the top to the bottom, from top corner points 812, 814, and 822 to bottom corner points 816, 818, and 820. FIG. 3 shows eight (8) flutes, each having an inward radiused contour extending from points 814 and 822 on the cup rim, downward along the sides of the cup 300 to the radiused contour between 818 and 820. The flute shown with reference numerals 822 and 814 at the top rim and running downward to 820 and 818 on the bottom perimeter, preferably, as shown, increase in radius moving from rim to bottom surface. Consequently, reference points that characterize adjacent side-wall flutes are oriented such that the spacing between flute radiused indentations along the top rim is larger than the spacing along the bottom perimeter. That is, in preferred embodiments, the distance between 814 and 812 on the top rim is larger than the distance between 818 and 816 on the bottom perimeter, with 812 and 816 characterizing the transition to the flute adjacent to the flute characterized by and delineated by points 822, 814, 820, and 818.

The top rim of the cup, as shown, forms the appearance of a star, and in similar fashion, as will be discussed below, the bottom perimeter also forms the appearance of a star. In other embodiments, not shown, the sections of the top rim such as between 812 and 814 (that, as shown, comprise a circular rim edge broken by the eight (8) flute indentations) may be lengthened as the distance (and radius) between 822 and 814 is decreased. In one embodiment, the distance between 822 and 814 is zero, which means the top rim is simply circular, and each of the flutes extending downward begin as a point at the top rim, widen to the bottom perimeter points 820 and 818, and taper inward into the interior space of the cup 300. The result is a cup having a circular opening (top rim) and star-shaped bottom surface/bottom perimeter.

In yet other embodiments, again not shown, the distance between adjacent flutes at the bottom perimeter may be reduced. That is, the distance between 818 and 816 along the bottom perimeter may be reduced. If the distance between 818 and 816 is reduced to zero, the result is a cup having, still, a star-shaped bottom surface/bottom perimeter, with each of the "points" of the star shape being sharply pointed (for example, adjacent flutes terminating at the same point 818=816) instead of stubbed by a substantially circular or cylindrical shape of the cup. For descriptive and illustrative purposes, if the bottom edges of the flutes were narrowed to a sharp point, for example if the distance between 820 and 818 is zero, the resulting bottom surface would be simply circular and no longer star-shaped.

The flutes running down the sides of the cup 300, as shown in FIG. 3, as the present inventor discovered, direct plant root growth downward and prevent root spiral. This anti-spiral effect improves vitality and vigor of the plant start. At the open top of cup 300, the radius difference (measured from the center of the cup) between 306 (which is the inward most edge along the top rim) and 302 (which is the outward most edge of the top rim) is the depth of the flute indentation into the interior space of the cup 300. As shown, the distance between 306 and 308 represents the smaller diameter (between opposed flute indentations), and the distance between 302 and 304 represents the larger diameter (between outermost edges) of the cup 300.

In preferred embodiments, the sides of the cup 300 (i.e. surfaces extending between points 822, 814, 812 on the top rim and points 820, 818, and 816 along the bottom perimeter) are longer than the diameter 302-304. In preferred embodiments, the inward facing surfaces (i.e. the surfaces facing inward on the radiused flutes extending from top rim to bottom perimeter) are taped so that the inward facing surface areas of the flutes increase as they extend downward toward the bottom surface of the cup 300. In preferred embodiments, the sides of the cup 300 are taped so that the largest diameter of the cup 300 at the top rim (i.e. diameter 302-304) is larger than the largest diameter of the cup 300 at the bottom perimeter (as will be discussed in FIG. 4 as diameter 402-404).

Figure 4:
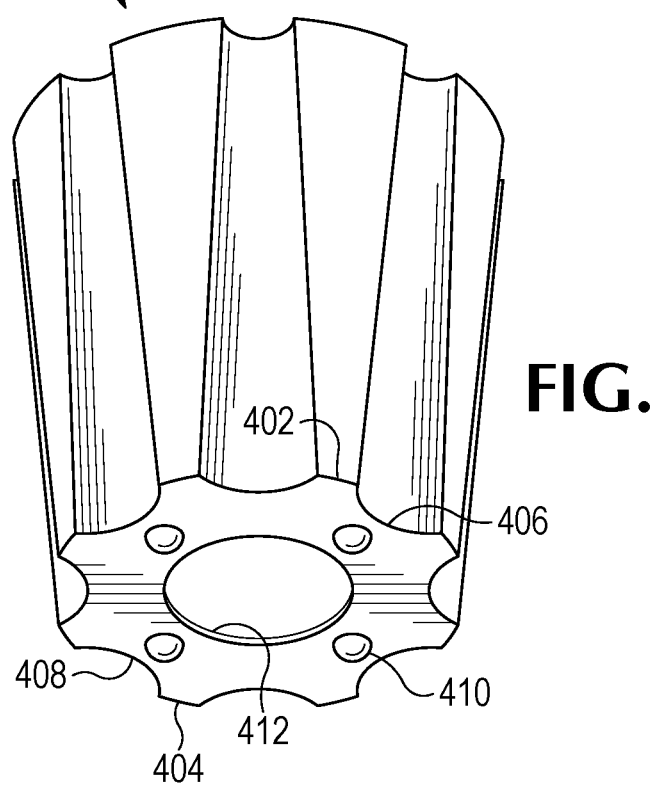
FIG. 4 shows a perspective view of an individual cup comprising the fifty cell tray depicted in FIGS. 1 and 2, as viewed from below, according to various embodiments.

FIG. 4 shows a perspective view of an individual cup 300 comprising the fifty cell tray 100 depicted in FIGS. 1 and 2, as viewed from below, according to various embodiments. As shown, the cup 300 preferably includes a hole 412 in the bottom surface, and the cup 300 preferably includes at least one nib 410 for creating space between the bottom surface of the cup 300 and whatever surface the tray 100 (and cup 300) is resting upon, to allow moisture to or from the cup interior via hole 412. The largest diameter of the bottom surface is the distance between 402 and 404 (i.e. diameter 402-404), and the smallest diameter of the bottom surface is the distance between 406 and 408 (i.e. diameter 406-408).

The radius at 406 is preferably larger than the (smaller) radius at 306, as previously discussed, resulting in a visibly wider flute indentation at the bottom of the cup 300 than at the top rim. Consequently, the intrusion of the flute indentations into the interior space of the cup 300 is greater toward the bottom of the cup 300 than at the top rim of the cup 300. This, in combination with diameter 402-404 being preferably smaller at the bottom of the cup 300 than diameter 302-304 at the top rim of the cup 300, provides a cup 300 with favorable die draw for molding/manufacturability and improved support of growing media inserted into the cup 300. Standard cylindrical or even square or rectangular shaped growing media plugs have improved air gaps and support with the cup 300 as shown and described. As the growing media plug is inserted, more of the cup 300 interior surfaces engage and support the exterior surfaces of the growing media plug.

Figure 5:
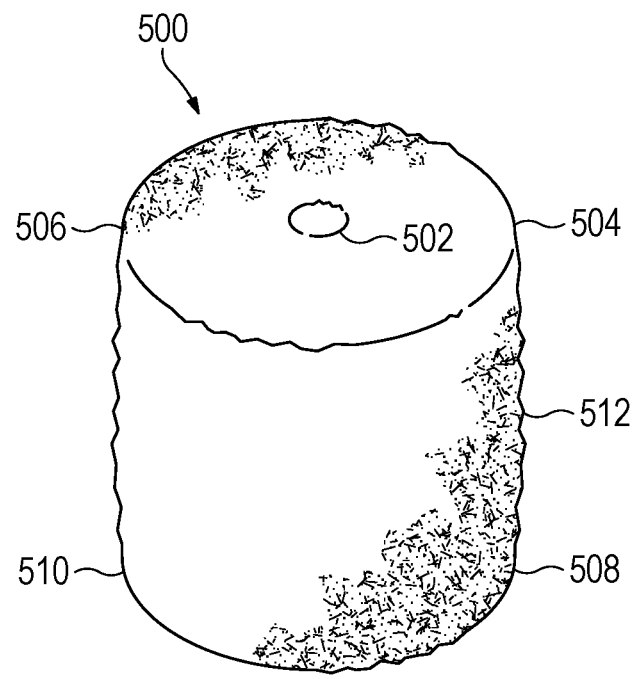
FIG. 5 shows a perspective view of a media plug for use with a propagation tray, preferably the propagation tray as depicted in FIGS. 1 and 2 and the individual cup as depicted in FIGS. 3 and 4, as viewed from above, according to preferred embodiments.

FIG. 5 shows a perspective view of a media plug 500 for use with a propagation tray, preferably the propagation tray 100 as depicted in FIGS. 1 and 2 and the individual cup 300 as depicted in FIGS. 3 and 4, as viewed from above, according to preferred embodiments. The growing media plug 500 preferably includes a hole 502 oriented substantially centrally on the top surface of the plug and sized to accept plant seed or a plant stem. As shown the media plug 500 is preferably substantially cylindrical with a top surface distance between sides 504 and 506 (i.e. defining a diameter 504-506) and a bottom surface distance between sides 508 and 510 (i.e. defining a diameter 508-510). The height of the media plug is, as shown, the distance between 504 at the top of the side 512 and 508 at the bottom of the side 512. In various embodiments the media plug 500 is cylindrical with diameter 504-506 being the same as diameter 508-510. In preferred embodiments, diameter 504-506 is larger than diameter 508-510, providing for a tapered cylindrically shaped growing media plug. In most preferred embodiments, diameter 504506 not larger than diameter 306-308 (i.e. the distance between opposed flute indentations along the top rim) so that the plug fits easily into the cup 300, and diameter 508-510 is larger than diameter 406-408 (the distance between opposed flute indentations at the bottom perimeter) so that the flutes extending downward into the cup 300 increasingly engage and support the growing media plug, for example along media plug side 512. In preferred embodiments, as the media plug is inserted into cup 300, an increasing amount of media side surface area becomes supported and engaged by the downwardly tapered flute indentations. In most preferred embodiments the air gaps left around the media plug 500 when inserted into the cup 300 leaves open side surface areas of the plug 500 within the range of 40% to 60% of the side surface area of the plug 500. In preferred embodiments, the air gaps between the sides of the media plug 500 and the sides of the cup 300 leave non-contact open areas of approximately 50%. In most preferred embodiments, the growing media plugs inserted into the propagation tray tend to stay in the tray when the tray is rotated from a normal horizontal growing orientation to a 90 degree angle. The present inventor discovered benefits in substantially matching the size of the growing media plugs 500 for the dimensions of the propagation tray cells 300.

The advantages of air gaps, as discovered by the present inventor, include improved root development in thickness and size, enabling the plant start to grow more vigorously upon transplantation when removed from the propagation tray. The downward directed flute indentations, the present inventor discovered, encourage root growth in a downward direction, separate from adjacently growing roots, and discourages spiral root growth that can lead to entangled and entrapped roots, such roots being disadvantaged upon transplantation from the propagation tray.

In preferred embodiments, the growing media plug 500 comprises peat moss (such as sphagnum peat moss or sphagnum moss, mixed with biochar made from forest waste at an inclusion rate of 5% by volume, and organic or natural polymer for helping bind the mixture together. In preferred embodiments, the amount of biochar is at least 5% by volume. The peat moss provides, as the inventor discovered, a favorable mixture of moisture retention, aeration properties, and the addition of biochar provides habitat for microorganisms (so the biology/organism resist drying out and dying), creates a negative charge for improved cation exchange capacity (so the plant roots are able to take up cations—$Ca^{2+}$, $K^+$, and $Mg^{2+}$), and noticeably improves the vitality and growth rate of plant starts using this mixture of peat moss and biochar, especially when combined with use of tray 100 with its cell/cup 300 features.

Biochar is generally created by pyrolysis (or low/minimal oxygen burning) of biomass at lower temperatures (around 500 degrees C.) (versus charcoal production which uses much higher temperatures). In testing with growing poinsettias, the present inventor discovered that mixing small amounts of biochar with peat moss yields the best results. The inventor tested mixtures with 1% by volume biochar, 2%, 3%, and so on, up to 15% biochar by volume, and discovered that plant start growth was negligibly improved with mixtures of peat moss up to 4% biochar. The inventor found that a mixture of peat moss and 5% by volume of biochar produced substantial improvement, and that using growing media plugs comprising 6% on up to 15% biochar by volume produced no substantial benefits or improvements over the formula comprising peat moss plus approximately 5% biochar by volume.

Figure 6:
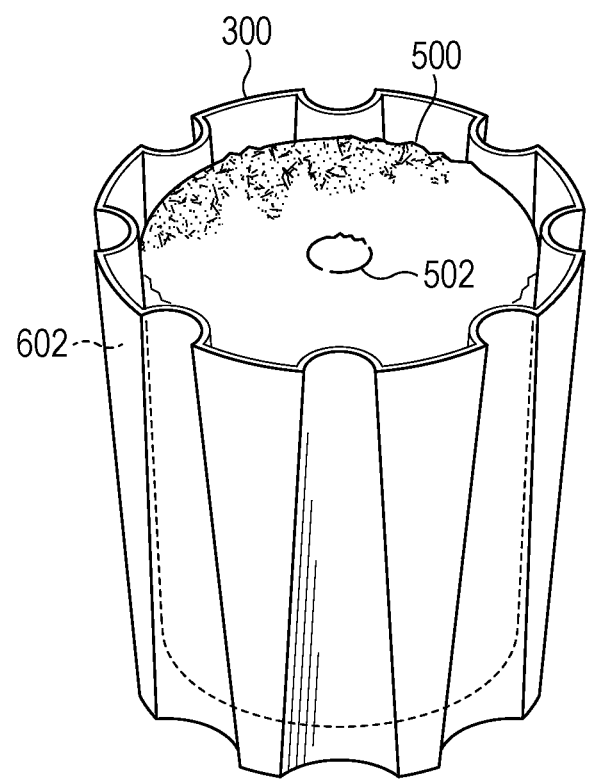
FIG. 6 shows a perspective view of the media plug depicted in FIG. 5 set within the cell or cup depicted in FIG. 3, as viewed from above, according to various preferred embodiments.

FIG. 6 shows a perspective view of the media plug 500 depicted in FIG. 5 set within the cell or cup 300 depicted in FIG. 3, as viewed from above, according to various preferred embodiments. In preferred embodiments, the media plug 500 is sized to be approximately flush with the top rim of the cup 300, or slightly below flush, as shown. As noted at 602, in preferred embodiments there are slightly more air gaps in the upper part of the plug and cup combination, and less air gaps lower in the cup 300.

Figure 7:
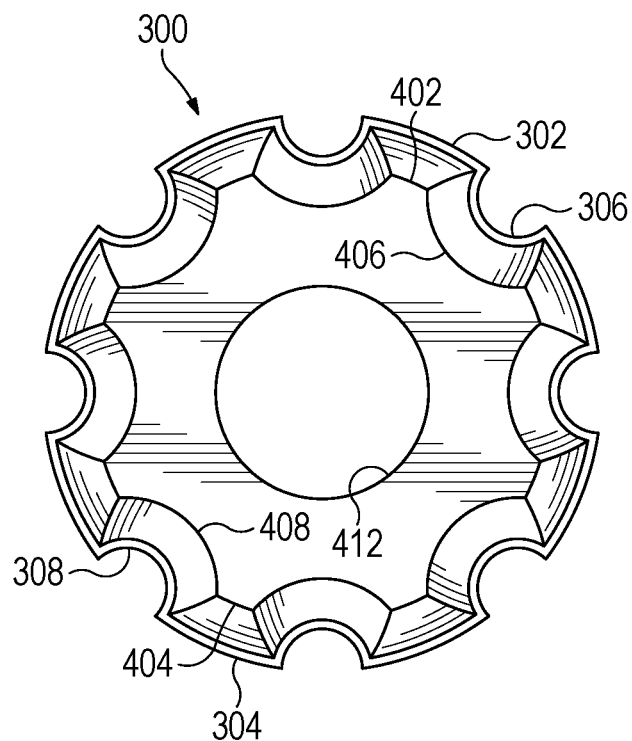
FIG. 7 shows a top view of the cup depicted in FIGS. 3 and 4, according to preferred embodiments.

FIG. 7 shows a top view of the cup 300 depicted in FIGS. 3 and 4, according to preferred embodiments. As discussed, the top rim of the cup 300 preferably has a star-shaped appearance, as does the bottom surface of the cup. In preferred embodiments, the hole 412 may be approximately ⅓ of the top rim largest diameter 302-304. Preferably the cup 300 includes 8 flute indentations, but other numbers are possible. Four to eight flutes is preferred, with the flutes equally spaced from one another. Fewer flutes may provide too large of air gaps and air gaps with too great a concentration. More flutes may decrease the effectiveness of the individual flutes to provide air gaps between the inside cup surfaces and the side edges of the growing media plug 500.

Figure 8:
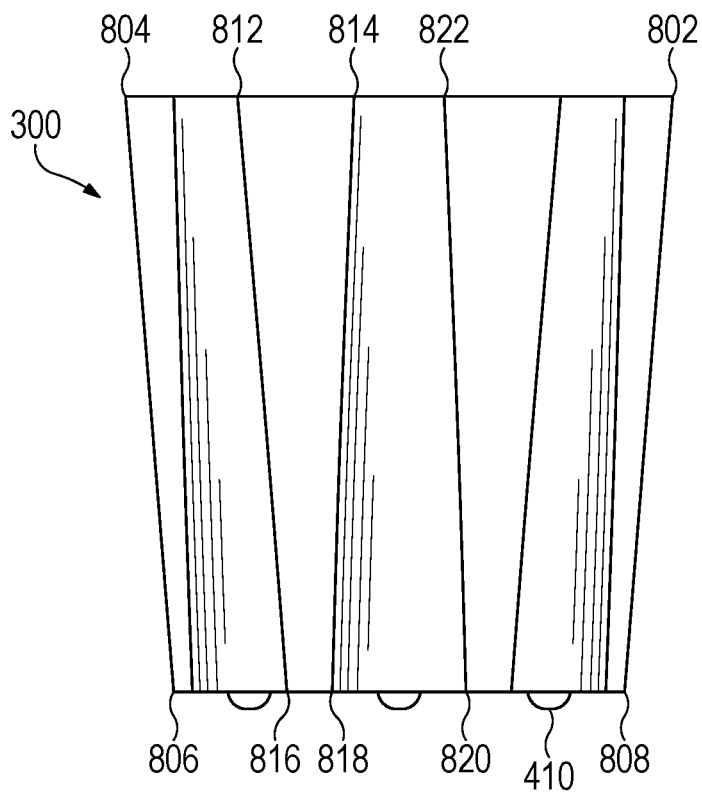
FIG. 8 shows a side view of the cup depicted in FIGS. 3, 4, and 7, according to preferred embodiments.

FIG. 8 shows a side view of the cup 300 depicted in FIGS. 3, 4, and 7, according to preferred embodiments. The top rim diameter is the distance between 802 and 804, which defines diameter 802-804 and is also the same as diameter 302-304. The bottom perimeter diameter is the distance between 806 and 808, which defines diameter 806-808 and is also the same as diameter 402-404. Three nibs 410 are shown in FIG. 8 due the orientation of the cup 300. Although four nibs 410 are preferably formed on the exterior bottom surface of each cup 300, more or less may be used in less preferred embodiments. In preferred embodiments, the bottom surface of the cup 300 includes at least one nib 410 creating space below the bottom surface and providing a fluid path from the interior of the cup 300, through the hole 412 in the bottom surface, and through the space created between the cup bottom surface and the nib 410.

Figure 9:
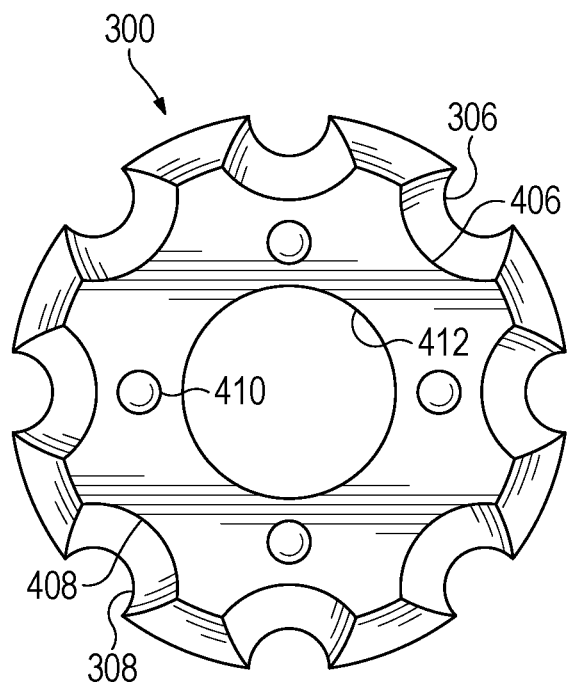
FIG. 9 shows a bottom view of the cup depicted in FIGS. 3, 4, 7, and 8, according to preferred embodiments.

FIG. 9 shows a bottom view of the cup 300 depicted in FIGS. 3, 4, 7, and 8, according to preferred embodiments. The four nibs 410 shown may be differently oriented and differently shaped.

Figure 10:
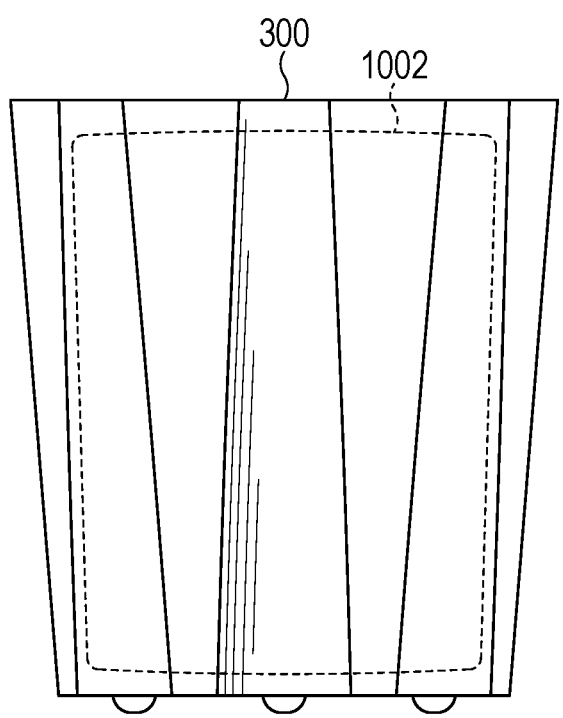
FIG. 10 shows a side view of the media plug depicted in FIG. 5 set within the cell or cup depicted in FIG. 8, according to preferred embodiments.

FIG. 10 shows a side view of the media plug 1002 depicted in FIG. 5 (shown in broken line) set within the cell or cup 300 depicted in FIG. 8, according to preferred embodiments. The media plug 1002 top surface is preferably just under flush with the top rim of the cup 300, and the width of the media plug 1002 is preferably sized so that there is more air gap near the top than near the bottom. The width of the growing media plug 1002 is preferably no more than the largest diameter of the cup bottom surface, or diameter 402-404 (or diameter 806-808). In most preferred embodiments, the width of the growing media plug 1002 is sized to result in a 50% air gap between the sides of the growing media plug 1002 and the sides of the cup 300.

Figure 11:
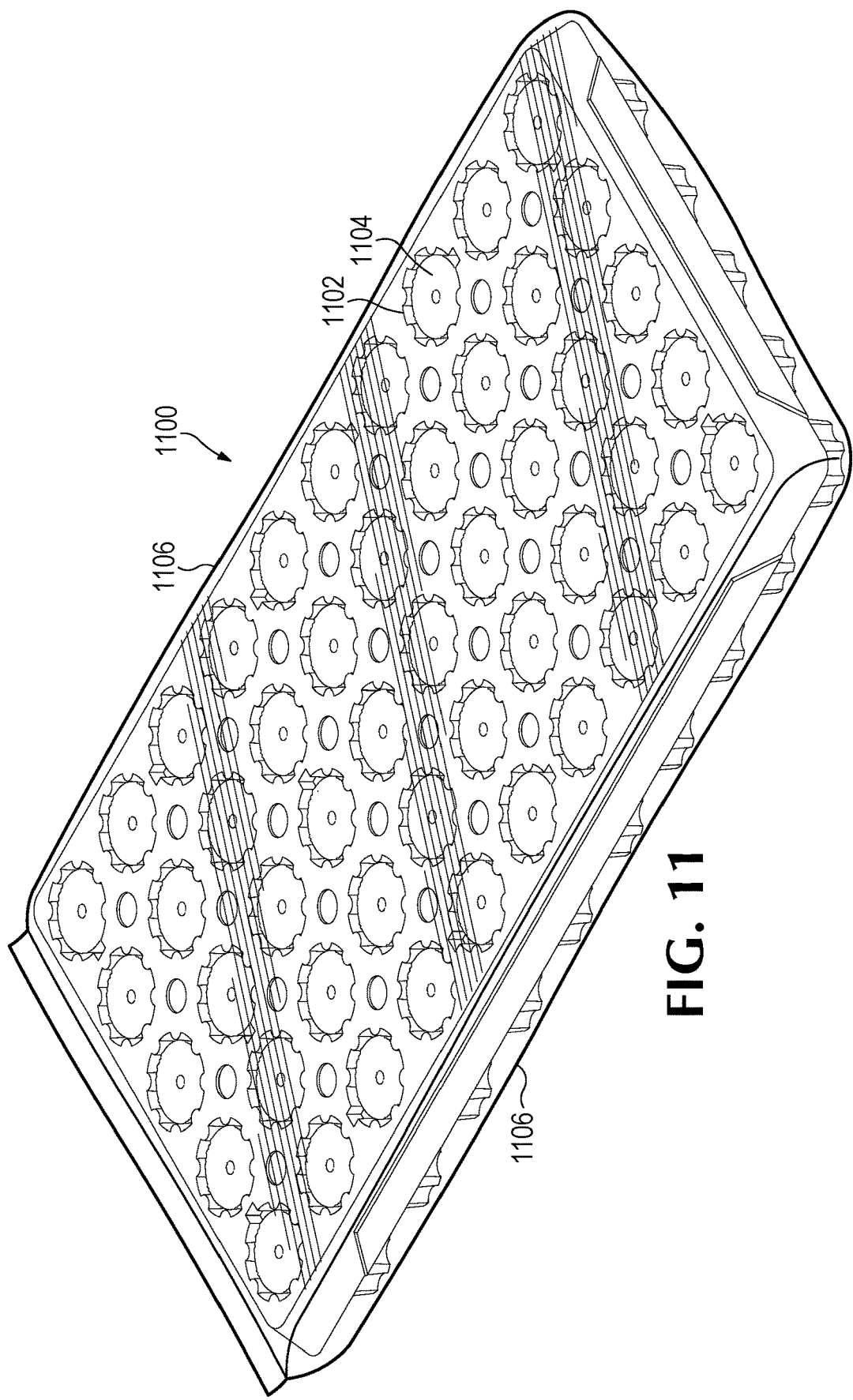
FIG. 11 shows a multiple cell tray with media plugs in each cell and enveloped to retain moisture.

FIG. 11 shows a multiple cell tray 1100 comprising rows of star-shaped cells 1102, each cell comprising a media plug 1104 therewithin, with the combined tray and plugs covered (enveloped) 1106 to retain moisture within the media plugs.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A multiple cell horticulture propagation tray, the tray comprising:
    cells formed in the tray, the cells being arranged in rows, each of the cells being configured to receive a growing media plug,
    wherein each of the cells comprises a cup having a top rim and a bottom perimeter and flutes comprising inwardly-radiused indentations running from the top rim to the bottom perimeter, and wherein the flutes are narrower at the top rim than at the bottom perimeter.

2. The tray of claim 1, wherein the inwardly-radiused indentations reduce an amount of interior space within each of the cells.

3. The tray of claim 1, wherein the cells are enveloped.

4. The tray of claim 1, wherein the top rim is star-shaped and the bottom perimeter is star-shaped.

5. The tray of claim 4, wherein the flutes extend from a point of the top rim to a corresponding point of the bottom perimeter.

6. The tray of claim 1, wherein a distance between opposite sides of the cell at the top rim is larger than a distance between opposite sides of the cell at the bottom perimeter.

7. The tray of claim 1, wherein each cell comprises a hole in a bottom surface.

8. The tray of claim 7, wherein each cell comprises at least one nib on an exterior of the bottom surface that provides a fluid path from an interior of the cell to space beneath the exterior of the bottom surface.

9. The tray of claim 1, further comprising one or more growing media plugs comprising peat moss and biochar.

10. The tray of claim 9, wherein an amount of biochar is approximately 5% of the growing media plug by volume.

11. The tray of claim 9, wherein an amount of biochar is at least 5% of the growing media plug by volume.

12. The tray of claim 9, wherein the biochar is formed from forest waste.

13. The tray of claim 9, wherein each of the one or more growing media plugs are substantially cylindrical in shape and sized to fit within one of the cells so as to be increasingly engaged with the corresponding flute.

14. The tray of claim 9, wherein each of the one or more growing media plugs are inserted in one of the cells, and wherein air gaps exist between sides of each of the one or more growing media plugs and interior surfaces of the respective cell.

15. The tray of claim 14, wherein the air gaps cover approximately 50% of a surface area of the sides of the one or more growing media plugs.

16. The tray of claim 14, wherein the air gaps cover a range of 40% to 60% of a surface area of the sides of the one or more growing media plugs.

17. A multiple cell horticulture propagation tray having star-shaped cells formed therein and arranged in rows, wherein each of the cells comprise:
a cup having a star-shaped top rim, a star-shaped bottom perimeter, and a bottom surface, the bottom surface having an exterior, wherein a distance between opposite sides of the cell at the top rim is larger than a distance between opposite sides of the cell at the bottom perimeter;
flutes each extending from a point of the star-shaped top rim to a corresponding point of the star-shaped bottom perimeter, wherein the flutes comprise inwardly-radiused indentations that reduce an amount of interior space within the cell, and wherein the flutes are narrower at the top rim than at the bottom perimeter; and
at least one nib on the exterior of the bottom surface that provides a fluid path from an interior of the cell to space beneath the exterior of the bottom surface.

18. A multiple cell horticulture propagation tray, the tray comprising:
cells formed in the tray, the cells being arranged in rows, each of the cells being configured to receive a growing media plug,
wherein each of the cells comprises a cup having a top rim and a bottom perimeter and flutes comprising inwardly-radiused indentations running from the top rim to the bottom perimeter, and
wherein the top rim is star-shaped and the bottom perimeter is star-shaped.

19. A multiple cell horticulture propagation tray, the tray comprising:
cells formed in the tray, the cells being arranged in rows, each of the cells being configured to receive a growing media plug,
wherein each of the cells comprises a cup having a top rim and a bottom perimeter and flutes comprising inwardly-radiused indentations running from the top rim to the bottom perimeter, and
wherein each of the cells comprises a hole in a bottom surface.

20. A multiple cell horticulture propagation tray, the tray comprising:
cells formed in the tray, the cells being arranged in rows, each of the cells being configured to receive a growing media plug, wherein each of the cells comprises a cup having a top rim and a bottom perimeter and flutes comprising inwardly-radiused indentations running from the top rim to the bottom perimeter; and
one or more growing media plugs comprising peat moss and biochar, wherein each of the one or more growing media plugs are inserted in one of the cells, and wherein air gaps exist between sides of each of the one or more growing media plugs and interior surfaces of the respective cell.

* * * * *